US010705819B2

(12) United States Patent
Furuichi et al.

(10) Patent No.: US 10,705,819 B2
(45) Date of Patent: Jul. 7, 2020

(54) UPDATING SOFTWARE BASED ON SIMILARITIES BETWEEN ENDPOINTS

(71) Applicant: International Business Machines Corporation, Armonk, NY (US)

(72) Inventors: Sanehiro Furuichi, Tokyo (JP); Takahito Tashiro, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 14/816,389

(22) Filed: Aug. 3, 2015

(65) Prior Publication Data

US 2016/0034269 A1  Feb. 4, 2016

(30) Foreign Application Priority Data

Aug. 4, 2014  (JP) ................................. 2014-158877

(51) Int. Cl.
*G06F 9/44* (2018.01)
*G06F 8/65* (2018.01)
(Continued)

(52) U.S. Cl.
CPC ............ *G06F 8/65* (2013.01); *G06F 9/44505* (2013.01); *H04L 41/084* (2013.01); *H04L 67/34* (2013.01)

(58) Field of Classification Search
CPC ................. G06F 8/61; G06F 8/65; G06F 8/71
(Continued)

(56) References Cited

U.S. PATENT DOCUMENTS 8,255,902 B1 * 8/2012 Satish .................. G06F 11/008
713/189
8,874,705 B1 * 10/2014 Satish .................. G06F 11/008
709/220
(Continued)

FOREIGN PATENT DOCUMENTS

JP      H01318446 A    12/1989
JP       05181706 A     7/1993
(Continued)

OTHER PUBLICATIONS

"IBM Endpoint Manager Version 9.1," IBM Corporation, copyright 2013, 2014, 28 pages.
(Continued)

*Primary Examiner* — Chat C Do
*Assistant Examiner* — Lenin Paulino
(74) *Attorney, Agent, or Firm* — Jamar K. Ray

(57) ABSTRACT

An apparatus for updating software or changing configuration of software installed in a plurality of terminals, including: a recognition unit for recognizing that the software installed in a first terminal has been successfully updated or the configuration of the software installed in the first terminal has been successfully changed; a selection unit for selecting, in response to the recognition that the software installed in the first terminal has been successfully updated or the configuration of the software installed in the first terminal has been successfully changed, a second terminal in a case where a degree of similarity between a configuration of the first terminal and a configuration of the second terminal is equal to or higher than a predetermined reference value; and an instruction unit for giving an instruction to update the software or to change the configuration of the software installed in the second terminal.

13 Claims, 10 Drawing Sheets

(51) Int. Cl.
 *H04L 29/08* (2006.01)
 *G06F 9/445* (2018.01)
 *H04L 12/24* (2006.01)

(58) Field of Classification Search
 USPC ........................................ 717/170, 171, 172
 See application file for complete search history.

(56) References Cited

U.S. PATENT DOCUMENTS

| | | | | |
|---|---|---|---|---|
| 2005/0047583 | A1* | 3/2005 | Sumner | H04M 3/5233 379/265.12 |
| 2009/0150878 | A1* | 6/2009 | Pathak | G06F 8/65 717/172 |
| 2009/0154420 | A1* | 6/2009 | Kim | H04L 41/00 370/331 |
| 2010/0332633 | A1* | 12/2010 | Keys | H04L 67/34 709/223 |
| 2012/0266155 | A1* | 10/2012 | Valeriano | G06F 8/65 717/172 |
| 2014/0149582 | A1* | 5/2014 | Chien | H04L 67/34 709/224 |
| 2014/0222818 | A1* | 8/2014 | Kikuchi | G06F 11/3006 707/737 |
| 2014/0372353 | A1* | 12/2014 | Yamamoto | G06F 16/9554 706/21 |

FOREIGN PATENT DOCUMENTS

| | | |
|---|---|---|
| JP | 10289101 A | 10/1998 |
| JP | 2000148454 A | 5/2000 |
| JP | 2001337817 A | 12/2001 |
| JP | 2003316676 A | 11/2003 |
| JP | 2006244383 A | 9/2006 |
| JP | 2009277130 A | 11/2009 |
| JP | 2012150650 A | 8/2012 |
| JP | 2012221170 A | 11/2012 |
| WO | WO2013051142 A1 | 4/2013 |

OTHER PUBLICATIONS

Furuichi et al., "Apparatus and Method for Updating Software", Patent Application No. 2014-158877, Filed Aug. 4, 2014, 58 pages.
Furuichi et al., "Updating Software Based on Similarities Between Endpoints", U.S. Appl. No. 15/346,797, filed Nov. 9, 2016.
List of IBM Patents or Patent Applications Treated as Related, dated Nov. 3, 2016, pp. 1-2.

* cited by examiner

Fig. 2A

| ENDPOINT ID | LAST UPDATE DATE AND TIME | MODEL NUMBER | MEMORY CAPACITY | HDD CAPACITY | HDD SPACE | OS INFORMATION |
|---|---|---|---|---|---|---|
| PC001 | 2014/01/15 02:00 | 1234-JP1 | 4GB | 500GB | 370GB | Win 7 JP SP1 |
| PC002 | 2014/01/15 02:00 | 1234-US1 | 4GB | 500GB | 241GB | Win 7 US SP2 |
| PC003 | 2014/01/15 02:00 | 2345-US1 | 16GB | 1TB | 817GB | Win 8 US |
| PC004 | 2014/03/14 03:00 | 2345-JP1 | 16GB | 1TB | 231GB | Win 8 JP |
| PC005 | 2014/01/15 02:00 | 1234-JP0 | 8GB | 340GB | 14GB | Win XP JP SP3 |

Fig. 2B

| ENDPOINT ID | APPLICATION NAME | VERSION | CATEGORY |
|---|---|---|---|
| PC001 | APPLICATION A | 8.0 | Browser |
| PC001 | APPLICATION B | 13.0 | Office Suites |
| PC001 | APPLICATION D | 8.5 | Groupware |
| PC002 | APPLICATION A | 11.0 | Browser |
| PC002 | APPLICATION B | 13.0 | Office Suites |
| PC002 | APPLICATION C | 13.0 | Office Suites |
| PC002 | APPLICATION D | 8.5 | Groupware |
| ... | | | |

Fig. 2C

| ENDPOINT ID | DEVICE NAME | DRIVER VERSION | CATEGORY |
|---|---|---|---|
| PC001 | DEVICE A | 9.18.13 | Graphics |
| PC001 | DEVICE B | 6.0.1 | Sound |
| PC001 | DEVICE C | 12.7.3 | SATA |
| PC002 | DEVICE A | 9.18.14 | Graphics |
| PC002 | DEVICE D | 4.5.6 | Sound |
| PC002 | DEVICE E | 5.6.7 | SCSI |
| ... | | | |

| ENDPOINT ID | EVENT OCCURRENCE DATE AND TIME | TARGET | STATE |
|---|---|---|---|
| PC001 | 2014/06/30 13:00 | USER X | LOG-ON |
| PC001 | 2014/06/30 13:01 | APPLICATION A | USE START |
| PC001 | 2014/06/30 13:01 | APPLICATION B | USE START |
| PC001 | 2014/06/30 13:10 | Network | CONNECTION (IP: xxx.xxx.xxx.xxx) |
| PC001 | 2014/06/30 13:15 | Location | Office A |
| PC001 | 2014/06/30 13:20 | APPLICATION A | USE STOP |
| PC001 | 2014/06/30 13:10 | APPLICATION B | USE STOP |
| PC001 | 2014/06/30 13:10 | Network | DISCONNECTION |
| PC001 | 2014/06/30 13:10 | USER X | LOG-OFF |
| PC001 | ..... | | |

Fig. 3

| ENDPOINT ID | LAST UPDATE DATE AND TIME | CONFIGURATION CHANGE ID | STATE |
|---|---|---|---|
| PC001 | 2014/06/24 10:00 | Fix012 | Success |
| PC001 | 2014/06/27 10:30 | Fix023 | In-Progress |
| PC002 | 2014/06/25 09:25 | Fix012 | Success |
| PC002 | 2014/06/27 18:40 | Fix023 | Success |
| PC003 | 2014/06/28 09:35 | Fix012 | Fail |

Fig. 4

| ENDPOINT ID | OS INFORMATION | | | | CONFIGURATION CHANGE ID | | APPLICATION INFORMATION | | DEVICE NAME |
|---|---|---|---|---|---|---|---|---|---|
| PC001 | ✓ | Windows | | | × | Fix002 | ✓ | APPLICATION A 8.0 | DEVICE A |
| | ✓ | 7 | | | ✓ | Fix003 | ✓ | APPLICATION B 13.0 | DEVICE B |
| | × | SP1 | | | ✓ | Fix006 | ✓ | APPLICATION D 8.5 | DEVICE C |
| | × | JP | | | ✓ | Fix012 | | | |
| DEGREE OF SIMILARITY | 2 / 4 | | | | 3 / 6 | | 2 / 5 | | 1 / 5 |
| PC002 | ✓ | Windows | | | × | Fix001 | × | APPLICATION A 11.0 | DEVICE A |
| | ✓ | 7 | | | ✓ | Fix003 | ✓ | APPLICATION B 13.0 | DEVICE D |
| | × | SP2 | | | ✓ | Fix006 | × | APPLICATION C 13.0 | DEVICE E |
| | × | US | | | ✓ | Fix012 | ✓ | APPLICATION D 8.5 | |
| | | | | | × | Fix023 | | | |

| OS1 | | | | OS2 | | | | DEGREE OF SIMILARITY |
|---|---|---|---|---|---|---|---|---|
| Windows | 7 | WITHOUT SP | JP | Windows | 7 | SP1 | JP | 0.8 |
| Windows | 7 | WITHOUT SP | JP | Windows | 7 | SP2 | JP | 0.6 |
| Windows | 7 | SP1 | JP | Windows | 7 | SP2 | JP | 0.85 |
| Windows | 7 | WITHOUT SP | JP | Windows | 7 | WITHOUT SP | US | 0.9 |
| .. | .. | .. | .. | .. | .. | .. | .. | .. |

Fig. 8B

| CONFIGURATION CHANGE ID | DEGREE OF SIMILARITY |
|---|---|
| Fix001 | 0.1 |
| Fix002 | 0.3 |
| Fix003 | 0.15 |
| Fix004 | 0.25 |
| .. | .. |

UPDATING SOFTWARE BASED ON SIMILARITIES BETWEEN ENDPOINTS

CROSS-REFERENCE TO RELATED APPLICATIONS

This application claims the benefit of priority to Japanese Patent Application No. 2014-158877, filed Aug. 4, 2014, the entire contents of which are incorporated herein by reference.

TECHNICAL FIELD

The present invention relates to an apparatus and a method for updating software or for changing configuration of software. In particular, the present invention relates to an apparatus and a method for updating software or for changing configuration of software installed in a plurality of terminals.

BACKGROUND ART

Along with development of IT technology, a wide variety of devices are used in organizations such as companies. Under the circumstance, burdens of management of devices (endpoints) on the organizations such as companies are rapidly increasing, and hence an endpoint management product is attracting attention (see, for example, Non-patent Literature 1).

In general, the endpoint management product provides a function of performing a configuration change on an endpoint. Here, the configuration change on the endpoint refers to a configuration change of a system or an application in the endpoint, and includes patching and application introduction. The endpoint management product also provides a function of remotely applying a configuration change to a plurality of endpoints at a time.

Further, in the endpoint management product, an endpoint as an application target of a configuration change can be generally designated using a conditional expression and the like. Specifically, the endpoint as the application target can be selected by designating the version of an operating system (OS), an application and patching conditions concerning the configuration change, and the configuration of the system (such as the value of a particular registry).

In the case of applying a configuration change to endpoints using the endpoint management product as described above, the following method is generally adopted. That is, a system department or the like applies in advance the configuration change to a test environment of an endpoint having a general configuration. After sufficiently testing that a trouble does not occur, the system section or the like applies the configuration change to endpoints of general users.

In addition to the above, a technique of setting up software in common for a plurality of apparatuses is known (see, for example, Patent Literature 1).

Patent Literature 1 discloses a technique in which an analysis apparatus determines common software to be set up for its own apparatus, reads out configuration information corresponding to the common software from a storage medium, compares configuration information on its own apparatus with the read-out information, determines an apparatus having the same configuration or an apparatus having a similar configuration from among apparatuses for which the common software has been set up, reads out set-up result information on the apparatus having the same configuration or the apparatus having a similar configuration from the storage medium, and outputs the read-out information as set-up success/failure information on the common software.

Moreover, a technique of making a processing program common to different database groups is also known (see, for example, Patent Literature 2).

Patent Literature 2 discloses a database system in which: an operating system reads setting information and determines which database is to be connected; when a compiler complies a database processing program (source format) in which a database to be processed is not specified, the compiler identifies a database to be processed in each step, on the basis of description of environment information recorded in a currently connected database; and the database processing program (object format) thus compiled is executed on a database group.

Further, a technique of constructing a calculator environment equivalent to various user PCs is also known (see, for example, Patent Literature 3).

Patent Literature 3 discloses an execution environment construction apparatus including: an environment configuration data creation unit for calculating the degree of demand of environment configuration data close to a user environment information DB demanded by a user, and constructing an execution environment on an execution terminal on the basis of the calculated degree of demand; and an environment configuration data selection unit for selecting environment configuration data having a degree of environment similarity close to the user environment information, from the execution terminal on which the execution environment is constructed. The execution environment construction apparatus constructs an execution environment configured by a software resource including at least one operating system, on an execution terminal.

CITATION LIST

Patent Literatures

[Patent Literature 1] JP2009-277130A
[Patent Literature 2] JP2006-244383A
[Patent Literature 3] JP2012-221170A

Non Patent Literature

IBM Endpoint Manager V9.1, available from International Business Machines Corporation.

As described above, in the case of applying a configuration change to endpoints using the endpoint management product as described in Non-patent Literature 1, conventionally, a test environment of an endpoint is prepared, and the configuration change is applied to the test environment. Unfortunately, particularly in organizations such as companies including a large number of users, it is not realistic to prepare a test environment that covers the configurations of endpoints of all the users. Hence, there is a problem that, if a configuration change is applied to an environment having a configuration that is not considered at the time of testing, a trouble in operation may occur.

Moreover, this problem does not limitatively occur in the case of applying the configuration change to the test environment, and can also occur in the case of updating software installed in a general terminal. That is, there is a problem that, even if software installed in one terminal has been successfully updated, software installed in another terminal is not necessarily successfully updated.

Note that the techniques of Patent Literatures 1 to 3 do not provide means for solving such problems.

SUMMARY OF INVENTION

The present invention has an object to enhance the possibility that, if software installed in one terminal has been successfully updated, the software installed in another terminal is also successfully updated.

Solution to Problems

In order to achieve the above-mentioned object, the present invention provides an apparatus for updating software or changing configuration of software installed in a plurality of terminals, including: a recognition unit for recognizing that the software installed in a first terminal of the plurality of terminals has been successfully updated or the configuration of the software installed in a first terminal of the plurality of terminals has been successfully changed; a selection unit for selecting, in response to the recognition that the software installed in the first terminal has been successfully updated or the configuration of the software installed in the first terminal has been successfully changed, a second terminal of the plurality of terminals in a case where a degree of similarity between a configuration of the first terminal and a configuration of the second terminal is equal to or higher than a predetermined reference value; and an instruction unit for giving an instruction to update the software or to change the configuration of the software installed in the second terminal.

The present invention also provides a method for updating software or for changing configuration of software installed in a plurality of terminals, including the steps of: giving an instruction to update the software or to change the configuration of the software installed in a first terminal of the plurality of terminals; recognizing that the software installed in the first terminal has been successfully updated or the configuration of the software installed in the first terminal has been successfully changed; selecting, in response to the recognition that the software installed in the first terminal has been successfully updated or the configuration of the software installed in the first terminal has been successfully changed, a second terminal of the plurality of terminals in a case where a degree of similarity between a configuration of the first terminal and a configuration of the second terminal is equal to or higher than a predetermined reference value; and giving an instruction to update the software or to change the configuration of the software installed in the second terminal.

The present invention also provides a program for causing a computer to function as an apparatus for updating software or changing configuration of software installed in a plurality of terminals, the program causing the computer to function as: a recognition unit for recognizing that the software installed in a first terminal of the plurality of terminals has been successfully updated or the configuration of the software installed in a first terminal of the plurality of terminals has been successfully changed; a selection unit for selecting, in response to the recognition that the software installed in the first terminal has been successfully updated or the configuration of the software installed in a first terminal of the plurality of terminals has been successfully changed, a second terminal of the plurality of terminals in a case where a degree of similarity between a configuration of the first terminal and a configuration of the second terminal is equal to or higher than a predetermined reference value; and an instruction unit for giving an instruction to update the software or to change the configuration of the software installed in the second terminal.

Advantageous Effect of Invention

The present invention can enhance the possibility that, if software installed in one terminal has been successfully updated, the software installed in another terminal is also successfully updated.

BRIEF DESCRIPTION OF DRAWINGS

FIG. 2A, FIG. 2B, and FIG. 2C are diagrams each illustrating a specific example of information stored in a configuration information DB;

FIG. 3 is a diagram illustrating a specific example of information stored in a working status DB;

FIG. 4 is a diagram illustrating a specific example of information stored in a change history DB;

FIG. 7 is a diagram for specifically describing a first method for calculating the degree of similarity by a degree-of-similarity calculation unit according to the embodiment of the present invention;

FIG. 8A and FIG. 8B are diagrams for specifically describing a second method for calculating the degree of similarity by the degree-of-similarity calculation unit according to the embodiment of the present invention;

DESCRIPTION OF EMBODIMENT

Figure 1:
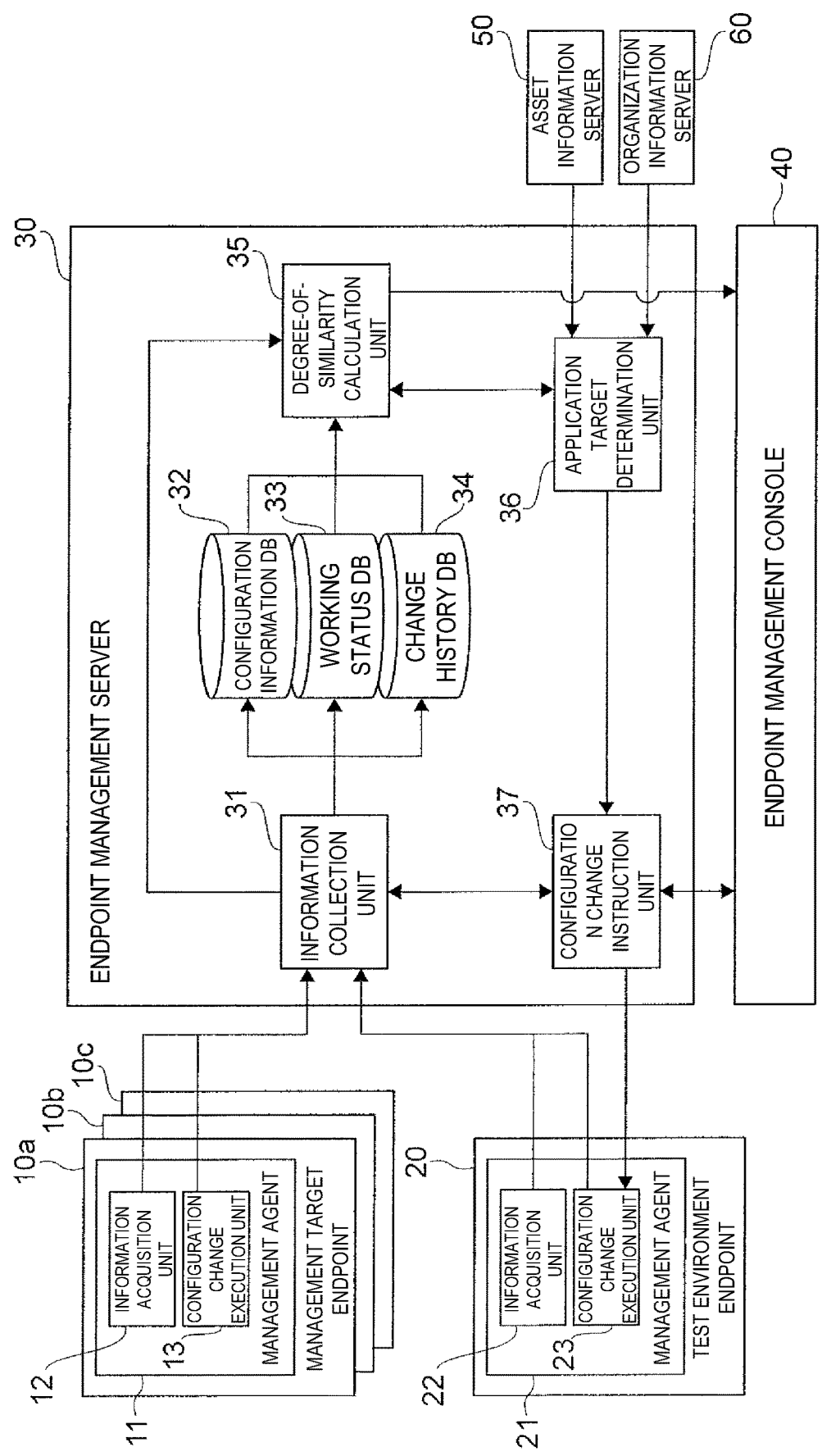
FIG. 1 is a diagram illustrating a function configuration example of an endpoint management system according to an embodiment of the present invention.

Hereinafter, an embodiment of the present invention is described in detail with reference to the attached drawings.

In order to achieve the above-mentioned object, the present invention provides an apparatus for updating software or changing configuration of software installed in a plurality of terminals, including: a recognition unit for recognizing that the software installed in a first terminal of the plurality of terminals has been successfully updated or the configuration of the software installed in a first terminal of the plurality of terminals has been successfully changed; a selection unit for selecting, in response to the recognition that the software installed in the first terminal has been successfully updated or the configuration of the software installed in the first terminal has been successfully changed, a second terminal of the plurality of terminals in a case where a degree of similarity between a configuration of the first terminal and a configuration of the second terminal is equal to or higher than a predetermined reference value; and an instruction unit for giving an instruction to update the software or to change the configuration of the software installed in the second terminal.

Here, the selection unit may select the second terminal in a case where a degree of priority of a user of the second terminal is equal to or higher than a predetermined reference value.

Moreover, the selection unit further may select, in response to the recognition that the software installed in the first terminal has been successfully updated or the configuration of the software installed in the first terminal has been successfully changed, a third terminal of the plurality of terminals in a case where a degree of similarity between the configuration of the first terminal and a configuration of the third terminal is equal to or higher than a predetermined reference value. The instruction unit may further give an instruction to update the software or to change the configuration of the software installed in the third terminal. In this case, the selection unit may select the second terminal and the third terminal in a case where a degree of association between a user of the second terminal and a user of the third terminal satisfies a predetermined condition. Alternatively, the selection unit may select the second terminal and the third terminal in a case where a degree of association between an installation place of the second terminal and an installation place of the third terminal satisfies a predetermined condition.

Moreover, the recognition unit may recognize that the software installed in a third terminal of the plurality of terminals has been successfully updated or the configuration of the software installed in a third terminal of the plurality of terminals has been successfully changed. The selection unit may select, in response to the recognition that the software installed in the third terminal has been successfully updated or the configuration of the software installed in the third terminal of the plurality of terminals has been successfully changed, a fourth terminal of the plurality of terminals in a case where at least any one of: a degree of similarity between the configuration of the first terminal and a configuration of the fourth terminal; and a degree of similarity between a configuration of the third terminal and the configuration of the fourth terminal is equal to or higher than a predetermined reference value. The instruction unit may give an instruction to update the software or to change the configuration of the software installed in the fourth terminal.

Further, this apparatus may further include a generation unit for generating information indicating a difference between a configuration of a third terminal of the plurality of terminals and a configuration of a fourth terminal of the plurality of terminals, in a case where it is not recognized that the software installed in the fourth terminal has been successfully updated or the configuration of the software installed in the fourth terminal has been successfully changed after it is recognized that the software installed in the third terminal has been successfully updated or the configuration of the software installed in the third terminal of the plurality of terminals has been successfully changed.

The present invention also provides an apparatus for updating software or for changing configuration of software installed in a plurality of terminals, including: a recognition unit for recognizing that the software installed in a configuration change verification terminal of the plurality of terminals has been successfully updated or the configuration of the software installed in a configuration change verification terminal of the plurality of terminals has been successfully changed, the configuration change verification terminal being for verifying the update of the software; a selection unit for selecting, in response to the recognition that the software installed in the configuration change verification terminal has been successfully updated or the configuration of the software installed in the configuration change verification terminal has been successfully changed, update execution terminals of the plurality of terminals in descending order of a degree of similarity between a configuration of the configuration change verification terminal and a configuration of each of the update execution terminals, the update execution terminals being for executing the update of the software; and an instruction unit for giving an instruction to update the software or to change the configuration of the software installed in each of the update execution terminals, in the order in which the update execution terminals are selected.

The present invention also provides a method for updating software or for changing configuration of software installed in a plurality of terminals, including the steps of: giving an instruction to update the software or to change the configuration of the software installed in a first terminal of the plurality of terminals; recognizing that the software installed in the first terminal has been successfully updated or the configuration of the software installed in the first terminal has been successfully changed; selecting, in response to the recognition that the software installed in the first terminal has been successfully updated or the configuration of the software installed in the first terminal has been successfully changed, a second terminal of the plurality of terminals in a case where a degree of similarity between a configuration of the first terminal and a configuration of the second terminal is equal to or higher than a predetermined reference value; and giving an instruction to update the software or to change the configuration of the software installed in the second terminal.

The present invention also provides a program for causing a computer to function as an apparatus for updating software or changing configuration of software installed in a plurality of terminals, the program causing the computer to function as: a recognition unit for recognizing that the software installed in a first terminal of the plurality of terminals has been successfully updated or the configuration of the software installed in a first terminal of the plurality of terminals has been successfully changed; a selection unit for selecting, in response to the recognition that the software installed in the first terminal has been successfully updated or the configuration of the software installed in a first terminal of the plurality of terminals has been successfully changed, a second terminal of the plurality of terminals in a case where a degree of similarity between a configuration of the first terminal and a configuration of the second terminal is equal to or higher than a predetermined reference value; and an instruction unit for giving an instruction to update the software or to change the configuration of the software installed in the second terminal.

Outline of Present Embodiment

In the present embodiment, the degree of similarity between an endpoint used for advance testing of a configuration change and each of the other endpoints is calculated using pieces of configuration information on a plurality of endpoints collected by an endpoint management product. Here, the configuration information includes, for example, the type and version of an OS, patching conditions, introduced applications, a hardware configuration, and configuration values (such as registries) of the system and the applications. Then, the endpoints are selected in descending order of the degree of similarity, and the configuration change is sequentially applied to the selected endpoints.

Moreover, in the present embodiment, in the case where a configuration change has been successfully applied to a given endpoint or a group of endpoints each having a configuration similar to that of the given endpoint, the configuration change is applied to the subsequent endpoint or group. Here, the expression that "a configuration change is successfully applied" may refer to that the configuration change can be applied, and, in the present embodiment, this expression refers to that no occurrence of a trouble can be confirmed within a predetermined operation evaluation period after the configuration change is applied.

At this time, in order to enhance the expansion speed of the range of endpoints as application targets, a part or the entirety of endpoints to which the configuration change has been successfully applied may be sequentially added as new reference endpoints for calculating the degree of similarity. Then, endpoints as new application targets may be determined on the basis of the degrees of similarity between the reference endpoints and each of the other endpoints.

Moreover, an endpoint as an application target may be determined on the basis of not only the degree of similarity between the configurations of endpoints but also multidimensional indexes. The multidimensional indexes include the degree of association between users of endpoints, the degree of association between installation places of endpoints, and the degree of priority of a user of an endpoint.

Among these indexes, the degree of association between users refers to, for example, the distance between organizations to which the users respectively belong (interorganization distance). The interorganization distance is obtained on the basis of organization information. Specifically, it is conceivable not to simultaneously apply a configuration change to a plurality of endpoints respectively used by a plurality of users who belong to close organizations. This can minimize an influence on business in case of trouble. It is also conceivable to preferentially apply a configuration change to a plurality of endpoints respectively used by a plurality of users who are connected to one another on a social networking service (SNS).

Moreover, the degree of association between installation places refers to, for example, the distance between the installation places. Specifically, in order to suppress a burden on communication lines, it is conceivable to limit the number of endpoints to which a configuration change is simultaneously applied, in the same business office.

Further, the degree of priority of a user refers to, for example, an IT skill level. Specifically, it is conceivable to preferentially apply a configuration change to an endpoint used by a user having a high IT skill level and then apply the configuration change to endpoints respectively used by users around the user having the high IT skill level. In this case, the user having the high IT skill level may be identified on the basis of working records of a registry editor, a system tool, and the like.

Moreover, the multidimensional indexes may include the use time and use frequency of an endpoint and the use time and use frequency of a particular application running on the endpoint.

Further, in the present embodiment, in the case where a trouble occurs when a configuration change is applied to a given endpoint, a difference between: the configuration of an endpoint to which the configuration change has been successfully applied immediately before; and the configuration of the given endpoint in which the trouble occurs may be presented. In this way, determination of a problem concerning a failure in applying the configuration change or setting of conditions in applying the configuration change may be supported.

Function Configuration of Endpoint Management System According to Present Embodiment FIG. 1 is a diagram illustrating a function configuration example of an endpoint management system according to the present embodiment. As illustrated in FIG. 1, the endpoint management system includes management target endpoints 10a to 10c, a test environment endpoint 20, an endpoint management server 30, an endpoint management console 40, an asset information server 50, and an organization information server 60. Then, the endpoint management server 30 is connected to the management target endpoints 10a to 10c, the test environment endpoint 20, the endpoint management console 40, the asset information server 50, and the organization information server 60, through communication lines (not illustrated) such as a local area network (LAN). Note that, although distinctively illustrated in FIG. 1, the management target endpoints 10a to 10c are referred to as the management target endpoint(s) 10 in the case where the management target endpoints 10a to 10c do not need to be distinguished from one another. Moreover, although only three management target endpoints 10 are illustrated in FIG. 1, in general, more than three management target endpoints 10 are connected.

Each management target endpoint 10 is an endpoint as a target to be managed in the endpoint management system. A management agent 11 is introduced in the management target endpoint 10, and the management agent 11 includes an information acquisition unit 12 and a configuration change execution unit 13. The information acquisition unit 12 acquires: configuration information indicating the configurations of hardware, an OS, applications, patches, and the like; and the working statuses of the hardware, the OS, the application, and the like. The configuration change execution unit 13 receives an instruction from the endpoint management server 30 to execute a process of applying a configuration change. Here, a desktop personal computer (PC), a notebook PC, a tablet PC, a personal digital assistant (PDA), a smartphone, and the like may be used as the management target endpoint 10.

The test environment endpoint 20 is an endpoint having a test environment for testing whether or not the configuration change is successfully applied to the management target endpoint 10 before the configuration change is applied thereto. A management agent 21 is introduced in the test environment endpoint 20. The configuration of the management agent 21 is similar to that of the management agent 11 introduced in the management target endpoint 10, and hence detailed description thereof is omitted. Here, a desktop PC, a notebook PC, a tablet PC, a PDA, a smartphone, and the like may be used as the test environment endpoint 20.

The endpoint management server 30 is a server computer in which the endpoint management product is installed, the server computer managing endpoints while controlling the management agent 11 introduced in the management target endpoint 10 and the management agent 21 introduced in the test environment endpoint 20. More detailed configuration thereof is described later. Here, a desktop PC and the like may be used as the endpoint management server 30.

The endpoint management console 40 is an input/output apparatus that is used by a system administrator to: instruct the endpoint management server 30 to apply the configuration change; and receive presentation of information from the endpoint management server 30.

The asset information server 50 is a server computer for holding asset information on assets managed by an organization such as a company including the endpoint management system. The asset information server 50 provides the asset information to the endpoint management server 30, in response to a request from the endpoint management server 30.

The organization information server 60 is a server computer for holding organization information on an internal organization such as a department in the organization such as the company including the endpoint management system. The organization information server 60 provides the organization information to the endpoint management server 30, in response to a request from the endpoint management server 30.

Here, a function configuration of the endpoint management server 30 is described in detail. As illustrated in FIG. 1, the endpoint management server 30 includes an information collection unit 31, a configuration information DB 32, a working status DB 33, a change history DB 34, a degree-of-similarity calculation unit 35, an application target determination unit 36, and a configuration change instruction unit 37.

The information collection unit 31 collects the configuration information and the working status of the management target endpoint 10 from the information acquisition unit 12 of the management agent 11, and collects the configuration information and the working status of the test environment endpoint 20 from the information acquisition unit 22 of the management agent 21. Moreover, the information collection unit 31 collects a result of applying the configuration change to the management target endpoint 10, from the configuration change execution unit 13 of the management agent 11, and collects a result of applying the configuration change to the test environment endpoint 20, from the configuration change execution unit 23 of the management agent 21. Then, the information collection unit 31 determines whether or not the configuration change has been successfully applied. In the present embodiment, the information collection unit 31 is provided as an example of a recognition unit for recognizing that software has been successfully updated.

The configuration information DB 32 is a database for storing configuration information collected by the information collection unit 31. Specific contents of the configuration information DB 32 are described later.

The working status DB 33 is a database for storing working statuses collected by the information collection unit 31. Specific contents of the working status DB 33 are described later.

The change history DB 34 is a database for storing change histories collected by the information collection unit 31. Specific contents of the change history DB 34 are described later.

The degree-of-similarity calculation unit 35 calculates the degree of similarity between a reference endpoint and each management target endpoint 10, on the basis of the pieces of data stored in the configuration information DB 32, the working status DB 33, and the change history DB 34. Moreover, the degree-of-similarity calculation unit 35 initially sets the test environment endpoint 20 to the reference endpoint, and then sets any of the management target endpoints 10 to which the configuration change has been successfully applied, to the reference endpoint as needed. Moreover, in the case where application of the configuration change to a given management target endpoint 10 has been failed, the degree-of-similarity calculation unit 35 extracts a difference between the configuration of the given management target endpoint 10 and the configuration of the management target endpoint 10 to which the configuration change has been successfully applied immediately before, and outputs the difference to the endpoint management console 40. In the present embodiment, the degree-of-similarity calculation unit 35 is provided as an example of a generation unit for generating information indicating the difference.

The application target determination unit 36 determines the management target endpoint 10 to which the configuration change is to be applied, on the basis of the degree of similarity calculated by the degree-of-similarity calculation unit 35. Alternatively, the application target determination unit 36 may determine the management target endpoint 10 to which the configuration change is to be applied, on the basis of not only the degree of similarity but also information such as the degree of association between users of endpoints, the degree of association between installation places of endpoints, and the degree of priority of a user of an endpoint. The number of the management target endpoints 10 that are determined at a time as application targets of the configuration change may be one. In the present embodiment, a group of a plurality of the management target endpoints 10 is determined as an application target of the configuration change. In the present embodiment, the application target determination unit 36 is provided as an example of a selection unit for selecting a terminal.

Upon reception of an instruction given by the system administrator from the endpoint management console 40, the configuration change instruction unit 37 transmits an instruction to apply the configuration change to the test environment endpoint 20, to the configuration change execution unit 23 of the management agent 21. Moreover, when the management target endpoint 10 to which the configuration change is to be applied is determined by the application target determination unit 36, the configuration change instruction unit 37 transmits an instruction to apply the configuration change to the determined management target endpoint 10, to the configuration change execution unit 13 of the management agent 11. In the present embodiment, the configuration change instruction unit 37 is provided as an example of an instruction unit for giving an instruction to update software or to change configuration of software.

Here, the contents of the information stored in the configuration information DB 32 are described. FIGS. 2A to 2C are diagrams each illustrating a specific example of the information stored in the configuration information DB 32.

FIG. 2A illustrates a basic information table in which basic information that is fundamental information on each endpoint is stored. As illustrated in FIG. 2A, the basic information table includes an endpoint ID, last update date and time, a model number, a memory capacity, a HDD capacity, a HDD space, and OS information. Among these pieces of information, the endpoint ID is identification information for identifying an endpoint, and the OS information is information indicating the type and version of an OS mounted on the endpoint. That is, the basic information table serves to manage which version of which OS is mounted on the endpoint identified by each endpoint ID. For example, the first row shows that Japanese-language version of Windows® 7, Service Pack 1 is mounted on an endpoint "PC001".

FIG. 2B illustrates an application information table in which information on applications installed in each endpoint is stored. As illustrated in FIG. 2B, the application information table includes an endpoint ID, an application name, a version, and a category. That is, the application information table serves to manage which version of which application is installed as an application in each category in the endpoint identified by each endpoint ID.

FIG. 2C illustrates a device information table in which information on a device mounted on each endpoint is stored. As illustrated in FIG. 2C, the device information table includes an endpoint ID, a device name, a driver version, and a category. That is, the device information table serves to manage which driver version of which device is installed as a device in each category in the endpoint identified by each endpoint ID.

Moreover, the contents of the information stored in the working status DB 33 are described. FIG. 3 is a diagram illustrating a specific example of the information stored in the working status DB 33. As illustrated in FIG. 3, the working status DB 33 includes an endpoint ID, event occurrence date and time, a target, and a state. That is, the working status DB 33 serves to manage in which target an event occurs and what the current state of the event is, in the endpoint identified by each endpoint ID.

Further, the contents of the information stored in the change history DB 34 are described. FIG. 4 is a diagram illustrating a specific example of the information stored in the change history DB 34. As illustrated in FIG. 4, the change history DB 34 includes an endpoint ID, last update date and time, a configuration change ID, and a state. Among these pieces of information, the configuration change ID is identification information for identifying a configuration change. An external table is referred to with the configuration change ID being used as a key, whereby detailed information on the configuration change can be acquired. Here, the detailed information on the configuration change includes the degree of urgency of the configuration change and conditions for applying the configuration change. Moreover, the state is a state of an endpoint after the configuration change is applied, and any of "Success", "Fail", and "In-Progress" is set to the state. Among these states, "Success" refers to a state in which no problem occurs even after the elapse of a predetermined evaluation period from the application of the configuration change, that is, a state in which the configuration change has been successfully applied. "Fail" refers to a state in which the configuration change has not been successfully applied or a state in which a problem occurs within the predetermined evaluation period from the application of the configuration change, that is, a state in which the application of the configuration change has been failed. "In-Progress" is a state in which whether or not a problem occurs is being evaluated after the configuration change is applied. That is, the change history DB 34 serves to manage a result of applying the configuration change to the endpoint identified by each endpoint ID.

Operation of Endpoint Management Server According to Present Embodiment

Next, an operation of the endpoint management server 30 according to the present embodiment is described. Prior to the operation, in the endpoint management server 30, first, the information collection unit 31 collects: the configuration information and the working status of the management target endpoint 10 acquired by the information acquisition unit 12 of the management agent 11; and the configuration information and the working status of the test environment endpoint 20 acquired by the information acquisition unit 22 of the management agent 21, and the information collection unit 31 stores the pieces of configuration information in the configuration information DB 32 and stores the working statuses in the working status DB 33. The information collection unit 31 also collects: a result of applying a configuration change to the management target endpoint 10 by the configuration change execution unit 13 of the management agent 11; and a result of applying the configuration change to the test environment endpoint 20 by the configuration change execution unit 23 of the management agent 21, and the information collection unit 31 stores the results as change histories of the configurations of the endpoints in the change history DB 34.

Figure 5:
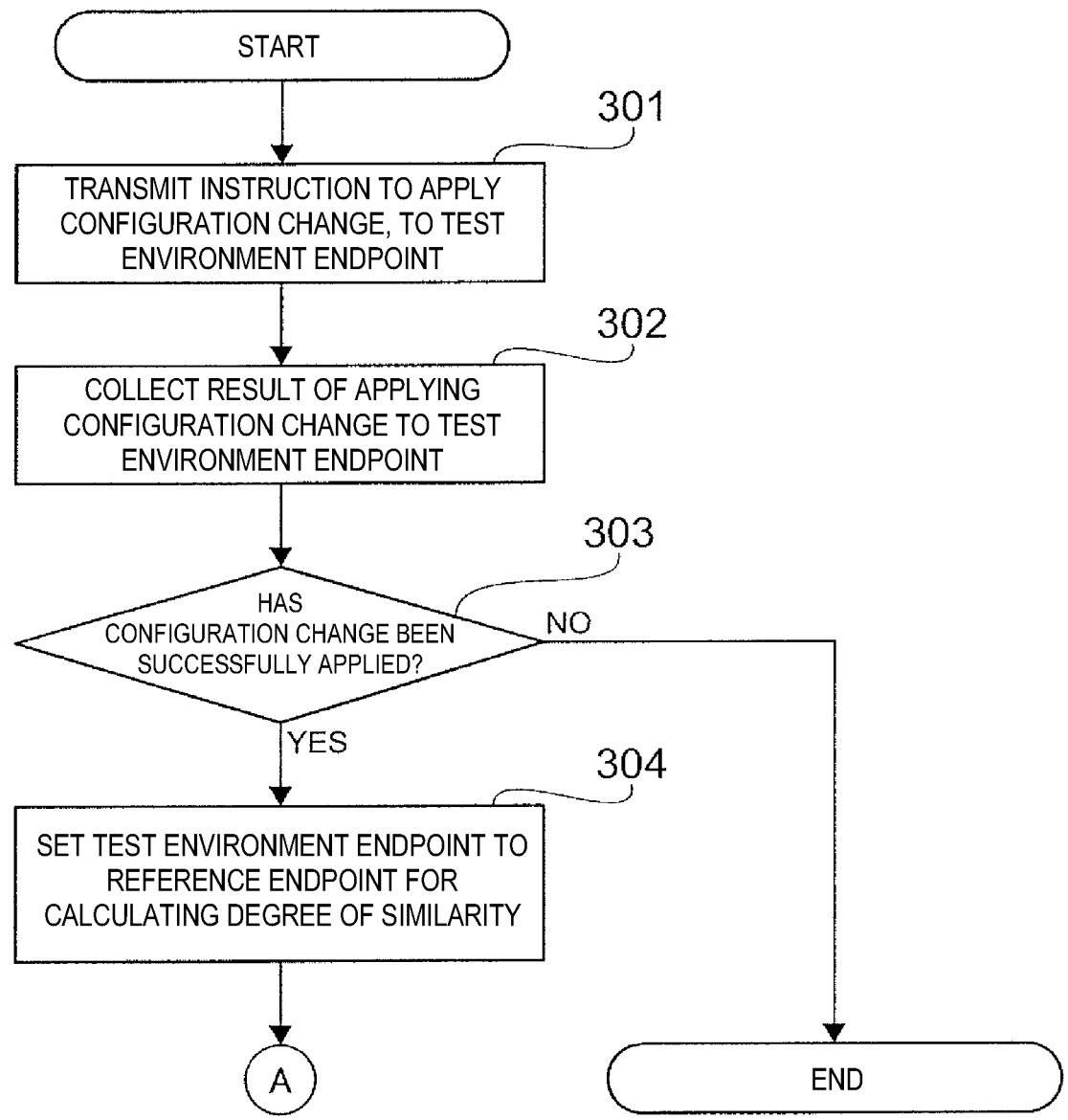
FIG. 5 is a flowchart illustrating an operation example of an endpoint management server according to the embodiment of the present invention.
Figure 6:
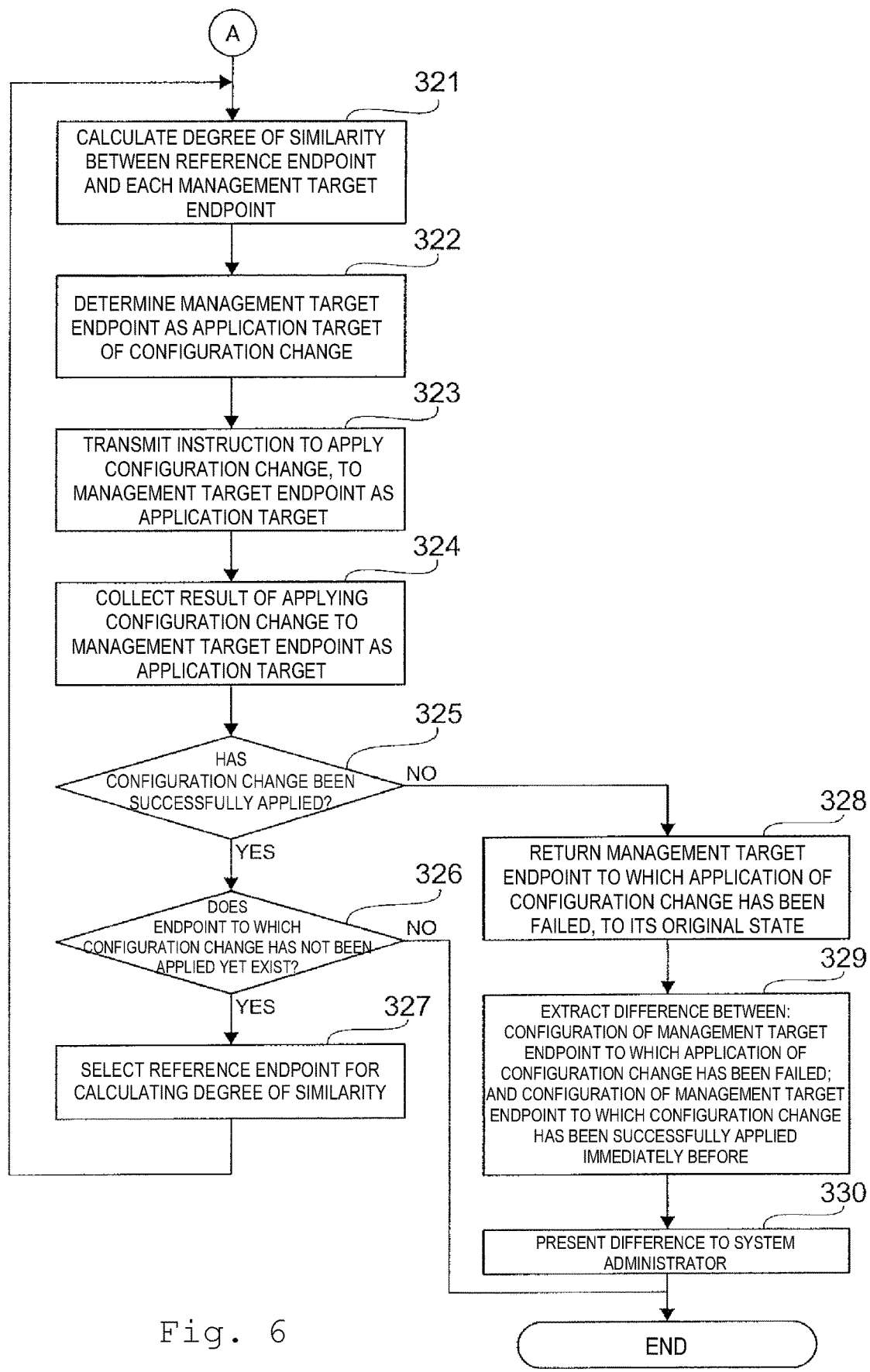
FIG. 6 is a flowchart illustrating an operation example of the endpoint management server according to the embodiment of the present invention.

It is assumed that, in this state, the system administrator instructs the endpoint management server 30 to apply the configuration change to the test environment endpoint 20, through the endpoint management console 40. This starts the operation of the endpoint management server 30. FIG. 5 and FIG. 6 are flowcharts each illustrating an operation example to be subsequently performed by the endpoint management server 30.

In the endpoint management server 30, first, as illustrated in FIG. 5, the configuration change instruction unit 37 transmits an instruction to apply the configuration change, to the configuration change execution unit 23 of the management agent 21 (Step 301). In response to this, the configuration change execution unit 23 of the management agent 21 applies the configuration change to the test environment endpoint 20. At this time, the system administrator designates which endpoint is to be defined as the test environment endpoint 20, using the corresponding endpoint ID, and designates which configuration change is to be applied, using the corresponding configuration change ID. Consequently, the used endpoint ID and the used configuration change ID are delivered from the configuration change instruction unit 37 to the information collection unit 31.

After that, the information collection unit 31 collects a result of applying the configuration change to the test environment endpoint 20, from the configuration change execution unit 23 of the management agent 21, and stores the result in the change history DB 34 (Step 302). Specifically, the information collection unit 31 stores the endpoint ID, the configuration change ID, and a state after the configuration change is applied, in the change history DB 34. Alternatively, at this time, the information collection unit 31 may report the obtained result to the system administrator through the endpoint management console 40.

Upon the collection of the result of applying the configuration change in this way, the information collection unit 31 determines whether or not the configuration change has been successfully applied to the test environment endpoint 20 (Step 303). As a result, if it is determined that the configuration change has not been successfully applied to the test environment endpoint 20, the endpoint management server 30 ends the processing. On the other hand, if it is determined that the configuration change has been successfully applied to the test environment endpoint 20, the endpoint management server 30 proceeds to a process of applying the same configuration change to every management target endpoint 10. At this time, the endpoint ID and the configuration change ID that have been delivered from the configuration change instruction unit 37 to the information collection unit 31 are further delivered to the degree-of-similarity calculation unit 35.

Consequently, the degree-of-similarity calculation unit 35 sets the received endpoint ID, that is, the endpoint ID of the test environment endpoint 20 to the endpoint ID of a reference endpoint that serves as a reference for calculating the degree of similarity (Step 304). Alternatively, the system administrator may check the result of applying the configuration change that is reported through the endpoint management console 40, and may give an instruction to apply the same configuration change to every management target endpoint 10, through the endpoint management console 40. At this time, the system administrator designates the endpoint ID of the test environment endpoint 20 as the endpoint ID of the reference endpoint that serves as the reference for calculating the degree of similarity, and designates the configuration change ID of the configuration change that has been applied to the test environment endpoint 20, as the configuration change ID of the configuration change to be applied to every management target endpoint 10.

As a result, in the endpoint management server 30, as illustrated in FIG. 6, the degree-of-similarity calculation unit 35 calculates the degree of similarity between the reference endpoint and each management target endpoint 10, on the basis of the pieces of data stored in the configuration information DB 32, the working status DB 33, and the change history DB 34 (Step 321). Note that, in the first operation, the reference endpoint is only the test environment endpoint 20. Moreover, at this time, the degree-of-similarity calculation unit 35 may store the calculated degree of similarity in a degree-of-similarity DB (not illustrated). The details of a method for calculating the degree of similarity are described later.

Subsequently, the application target determination unit 36 determines the management target endpoint 10 to which the configuration change is to be applied, on the basis of the degree of similarity calculated by the degree-of-similarity calculation unit 35 (Step 322). At this time, basically, the application target determination unit 36 determines, as an application target, a group including the management target endpoints 10 for which the highest degree of similarity is calculated. For example, the application target determination unit 36 may select a predetermined number of the management target endpoints 10 in descending order of the degree of similarity, and may determine a group including the selected management target endpoints 10 as the application target. Alternatively, the application target determination unit 36 may select the management target endpoints 10 each having a degree of similarity equal to or higher than a predetermined value, and may determine a group including the selected management target endpoints 10 as the application target.

Alternatively, the application target determination unit 36 may determine the application target with reference to not only the degree of similarity but also additional information on the user of each management target endpoint 10, the organization to which the user belongs, and the like. The additional information is included in, for example, the asset information held by the asset information server 50 and the organization information held by the organization information server 60, and hence the application target determination unit 36 may refer to these pieces of information. The details of a method for determining the application target are also described later. Upon the determination of the application target in this way, the application target is reported to the configuration change instruction unit 37. Specifically, the endpoint ID of the management target endpoint 10 determined as the application target is reported to the configuration change instruction unit 37. Moreover, the configuration change ID of the configuration change to be applied is also transmitted from the degree-of-similarity calculation unit 35 to the application target determination unit 36, and is further transmitted to the configuration change instruction unit 37.

As a result, the configuration change instruction unit 37 transmits an instruction to apply the configuration change, to the configuration change execution unit 13 of the management agent 11 operating in the management target endpoint 10 that has been determined as the application target by the application target determination unit 36 (Step 323). Consequently, the configuration change execution unit 13 of the management agent 11 applies the configuration change to the management target endpoint 10. At this time, the endpoint ID of the management target endpoint 10 determined as the application target and the configuration change ID of the configuration change are delivered from the configuration change instruction unit 37 to the information collection unit 31.

After that, the information collection unit 31 collects a result of applying the configuration change to the management target endpoint 10, from the configuration change execution unit 13 of the management agent 11, and stores the result in the change history DB 34 (Step 324). Specifically, the information collection unit 31 stores the endpoint ID, the configuration change ID, and a state after the configuration change is applied, in the change history DB 34.

Upon the collection of the result of applying the configuration change in this way, the information collection unit 31 determines whether or not the configuration change has been successfully applied to the management target endpoint 10 (Step 325).

As a result, if it is determined that the configuration change has been successfully applied to the management target endpoint 10, the degree-of-similarity calculation unit 35 determines whether or not an endpoint to which the configuration change has not been applied yet exists, with reference to the change history DB 34 (Step 326).

Then, if it is determined that an endpoint to which the configuration change has not been applied yet exists, the degree-of-similarity calculation unit 35 sets an additional reference endpoint that serves as a reference for calculating the degree of similarity (Step 327). Note that Step 327, which is not essential, may be executed as needed. That is, if any of the management target endpoints 10 to which the configuration change has been successfully applied has a configuration that is as different as possible from the configuration of the currently set reference endpoint, the degree-of-similarity calculation unit 35 may set this management target endpoint 10 as the additional reference endpoint. If it is determined in Step 326 that an endpoint to which the configuration change has not been applied yet exists or after the additional reference endpoint is set in Step 327 as described above, the endpoint management server 30 repeats the processing of Step 321 and the subsequent steps. That is, the degree-of-similarity calculation unit 35 calculates the degree of similarity between: each of the plurality of reference endpoints including the additional reference endpoint; and each endpoint other than the reference endpoints, the application target determination unit 36 determines an endpoint having the second highest degree of similarity as an application target of the configuration change, and the information collection unit 31 collects a result of applying the configuration change.

Meanwhile, description is given of the case where it is determined in Step 325 that the application of the configuration change to the management target endpoint 10 has been failed. This case means that it is determined that the application of the configuration change to any of the management target endpoints 10 included in the group determined in Step 322 has been failed. If such a failure is determined, first, the configuration change instruction unit 37 returns the management target endpoint 10 concerning the failure to its original state before the configuration change is applied thereto (Step 328). Specifically, the endpoint ID of the management target endpoint 10 to which the application of the configuration change has been failed is delivered from the information collection unit 31 to the configuration change instruction unit 37. Then, the configuration change instruction unit 37 returns the management target endpoint 10 identified by the received endpoint ID to its original state.

Further in this case, subsequently, the degree-of-similarity calculation unit 35 extracts a difference between: the configuration of the management target endpoint 10 concerning the failure; and the configuration of the management target endpoint 10 to which the configuration change has been successfully applied immediately before (Step 329). Specifically, the endpoint ID of the management target endpoint 10 to which the application of the configuration change has been failed is delivered from the information collection unit 31 to the configuration change instruction unit 37. Then, the degree-of-similarity calculation unit 35 extracts a difference between the configuration of the management target endpoint 10 identified by the received endpoint ID and the configuration of the management target endpoint 10 to which the configuration change has been successfully applied immediately before. Here, the management target endpoint 10 to which the configuration change has been successfully applied immediately before may be defined as the management target endpoint 10 to which the configuration change has been successfully applied immediately before, among the endpoints included in the group to which the configuration change has been simultaneously applied in the latest Step 323.

As a result, the degree-of-similarity calculation unit 35 presents the extracted difference to the system administrator through the endpoint management console 40 (Step 330).

Moreover, if it is determined in Step 326 that an endpoint to which the configuration change has not been applied yet does not exist, the endpoint management server 30 ends the processing.

Note that, in the present embodiment, as long as an endpoint to which the configuration change has not been applied yet remains, a process of calculating the degree of similarity and determining an application target is performed, but the present invention is not limited thereto. A minimum value of the degree of similarity up to which this process needs to be performed may be designated in advance, and the endpoint management server 30 may end the processing at the moment at which an endpoint having a degree of similarity equal to or higher than the minimum value does not remain.

Here, methods for calculating the degree of similarity by the degree-of-similarity calculation unit 35 are described in detail.

A first method for calculating the degree of similarity is a method including: calculating a correlation on the basis of the coincidence or non-coincidence of items in each constituent element between endpoints as targets between which the degree of similarity is to be calculated; and defining the calculated correlation as the degree of similarity between the configurations of the endpoints. Here, examples of the constituent elements of the endpoints include hardware, an OS, applications, applied patches, the versions thereof, and registry setting items thereof.

FIG. 7 is a diagram for specifically describing the first method for calculating the degree of similarity.

In the case of adopting the first calculating method, first, the degree-of-similarity calculation unit 35 acquires, for each category, the items of the constituent elements constituting each endpoint. In FIG. 7, the degree-of-similarity calculation unit 35 acquires, for the OS, the type of the OS, the version of the OS, the presence or absence and version of a service pack, and a language. The degree-of-similarity calculation unit 35 also acquires: configuration change IDs for identifying configuration changes applied to each endpoint; application information including the names and versions of applications installed in the endpoint; and device names that are the names of devices mounted on the endpoint.

Subsequently, the degree-of-similarity calculation unit 35 calculates a ratio of coincident items in each constituent element, for two endpoints as targets between which the degree of similarity is to be calculated. FIG. 7 illustrates "PC001" and "PC002" as the two endpoints. Then, the number of coincident items in each constituent element is defined as the numerator of the ratio. In FIG. 7, each coincident item is indicated by a check mark, and each non-coincident item is indicated by a cross mark. That is, the number of check marks in each constituent element corresponds to the numerator. Moreover, the denominator of the ratio is determined in the following manner. That is, for the OS, the number of items is fixed, and hence the number of items is defined as the denominator of the ratio. Moreover, for the other constituent elements, the number of elements in the union of the listed items is defined as the denominator of the ratio. In FIG. 7, for the OS, because the number of check marks is "2" and the number of items is "4", the degree of similarity is expressed as "2/4". For the configuration change ID, because the number of check marks is "3" and the number of elements in the union of the items is "6", the degree of similarity is expressed as "3/6". For the application information, because the number of check marks is "2" and the number of elements in the union of the items is "5", the degree of similarity is expressed as "2/5". For the device name, because the number of check marks is "1" and the number of elements in the union of the items is "5", the degree of similarity is expressed as "1/5".

Lastly, the degree-of-similarity calculation unit 35 calculates the average of the respective degrees of similarity of the constituent elements, and defines the calculated average as the degree of similarity between the configurations of the two endpoints. In FIG. 7, the degree-of-similarity calculation unit 35 calculates the average of "2/4", "3/6", "2/5", and "1/5", and hence the degree of similarity between the configurations of the two endpoints is 0.4 (=1.6/4).

A second method for calculating the degree of similarity is a method including: calculating the sum of weighted degrees of similarity, using a table in which the degree of similarity between items or between combinations of items is defined for each constituent element; and defining the calculated sum as the degree of similarity between the configurations of endpoints.

FIGS. 8A and 8B are diagrams for specifically describing the second method for calculating the degree of similarity. In the case where the degree of similarity between items or between combinations of items is calculated by considering the weights of the items, a table in which the degree of similarity between combinations of items or the degree of similarity when items coincide with each other is defined for each constituent element is prepared in advance.

FIG. 8A is a diagram illustrating an example of an OS degree-of-similarity table. The degree of similarity when the combination of the items in OS 1 and the combination of the items in OS 2 completely coincide with each other is defined as "1", and the degree of similarity indicating to what extent the combination of the items in OS 1 and the combination of the items in OS 2 coincide with each other is defined in the table. The degree-of-similarity calculation unit 35 defines the degree of similarity in a row having the same combination as the combination of respective OSs of two endpoints as targets between which the degree of similarity is to be calculated, as the degree of similarity in OS.

FIG. 8B is a diagram illustrating an example of a configuration change degree-of-similarity table. The degree-of-similarity calculation unit 35 defines the sum of the degrees of similarity for all configuration changes commonly applied to the two endpoints as the targets between which the degree of similarity is to be calculated, as the degree of similarity in configuration change. Moreover, similar degree-of-similarity tables may be prepared also for the application information and the device name, and the sum of the degrees of similarity for items common between the two endpoints as the targets between which the degree of similarity is to be calculated may be defined as the degree of similarity in each of the application information and the device name.

A third method for calculating the degree of similarity is a method including: defining in advance the degree of similarity between items or between combinations of items for each constituent element, depending on the degree of association with a configuration change to be applied; calculating the sum of weighted degrees of similarity on the basis of the definition; and defining the calculated sum as the degree of similarity between the configurations of endpoints.

Such tables as illustrated in FIGS. 8A and 8B are prepared for each configuration change to be applied, and settings are made such that the degrees of similarity for items concerning the configuration change to be applied is high. This case corresponds to the third calculating method.

Next, methods for determining the application target by the application target determination unit 36 are described in detail. It is assumed here that the application target determination unit 36 determines the application target considering an interorganization distance in addition to the degree of similarity between the configurations of endpoints. Conceivable methods for determining the application target considering the interorganization distance are as follows.

A first method for determining the application target is a method including preferentially applying a configuration change to endpoints in the same organization or close organizations. In the case of adopting the first method for determining the application target, first, the application target determination unit 36 groups endpoints for each interorganization distance from a reference endpoint. Subsequently, the application target determination unit 36 selects endpoints in descending order of the degree of similarity to the reference endpoint, from a group corresponding to an interorganization distance smaller than a predetermined distance, and sequentially applies the configuration change to the selected endpoints.

A second method for determining the application target is a method for avoiding simultaneously applying a configuration change to endpoints in the same organization or close organizations. Also in the case of adopting the second method for determining the application target, first, the application target determination unit 36 groups endpoints for each interorganization distance from a reference endpoint. Then, the application target determination unit 36 selects an endpoint having the highest degree of similarity to the reference endpoint, from a group corresponding to the largest interorganization distance, and applies the configuration change to the selected endpoint. Subsequently, the application target determination unit 36 groups the endpoints for each sum of the interorganization distance from the first reference endpoint and the interorganization distance from the endpoint selected immediately before. Then, the application target determination unit 36 selects an endpoint having the highest degree of similarity to the reference endpoint, from a group corresponding to the largest sum of the interorganization distances, and applies the configuration change to the selected endpoint. After that, the application target determination unit 36 repeats such processing as described above.

Figures 9A, 9B:
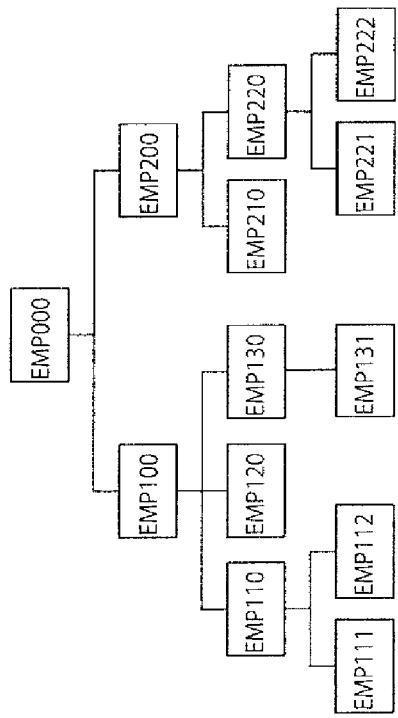
FIG. 9A and FIG. 9B are diagrams for specifically describing a method for calculating an interorganization distance by an application target determination unit according to the embodiment of the present invention.

FIGS. 9A and 9B are diagrams for specifically describing a method for calculating the interorganization distance used in the above-mentioned methods for determining the application target. Of the two drawings, FIG. 9A illustrates an example of the asset information held by the asset information server 50. Moreover, FIG. 9B illustrates an example of the organization information held by the organization information server 60. Note that, because an organization is expressed in a tree structure in FIG. 9B, a node corresponding to each user is referred to as a "user node". Moreover, a node generally referred to as an "upper node" is referred to as a "superior node", and a node generally referred to as a "lower node" is referred to as a "subordinate node".

First, with reference to the asset information in FIG. 9A, the application target determination unit 36 obtains the user IDs of two users who respectively use two endpoints as targets between which the interorganization distance is to be calculated, from the endpoints ID of the two endpoints.

Subsequently, with reference to the organization information in FIG. 9B, the application target determination unit 36 obtains a closest common superior node that is the lowest one of superior nodes common to two user nodes respectively corresponding to the two user IDs. Note that, in the case where one of the two user nodes is a subordinate node of the other user node, the application target determination unit 36 obtains the other user node as the closest common superior node.

Subsequently, with reference to the organization information in FIG. 9B, the application target determination unit 36 obtains the distance from each of the two user nodes to the closest common superior node. Then, the application target determination unit 36 defines the larger one of the two distances thus obtained, as the interorganization distance.

For example, it is discussed that, in the case where the asset information in FIG. 9A and the organization information in FIG. 9B are held, the interorganization distance between the endpoint "PC001" and an endpoint "PC005" is calculated. In this case, first, with reference to the asset information in FIG. 9A, the application target determination unit 36 identifies a user "EMP111" from the endpoint "PC001", and identifies a user "EMP220" from the endpoint "PC005". Subsequently, with reference to the organization information in FIG. 9B, the application target determination unit 36 obtains a closest common superior node "EMP000". Subsequently, the application target determination unit 36 obtains "3" as the distance from the user node "EMP111" to the closest common superior node "EMP000", and obtains "2" as the distance from the user node "EMP220" to the closest common superior node "EMP000". Lastly, the application target determination unit 36 calculates the interorganization distance "3" according to max (3, 2).

As described above, in the present embodiment, a configuration change is sequentially applied considering the degree of similarity between the configurations of endpoints, and the configuration change is automatically stopped in case of trouble. Accordingly, a trouble that cannot be found at the time of advance testing can be prevented from simultaneously occurring in a large indefinite number of endpoints, and influences such as suspension of business can be minimized.

Moreover, in the present embodiment, a configuration change is sequentially applied to endpoints in descending order of the degree of similarity in configuration to a reference endpoint. Accordingly, even if a trouble occurs in a given endpoint, a difference between the configuration of the given endpoint and the configuration of an endpoint to which the configuration change has been successfully applied is small, and hence problem determination work is facilitated.

Figure 10:
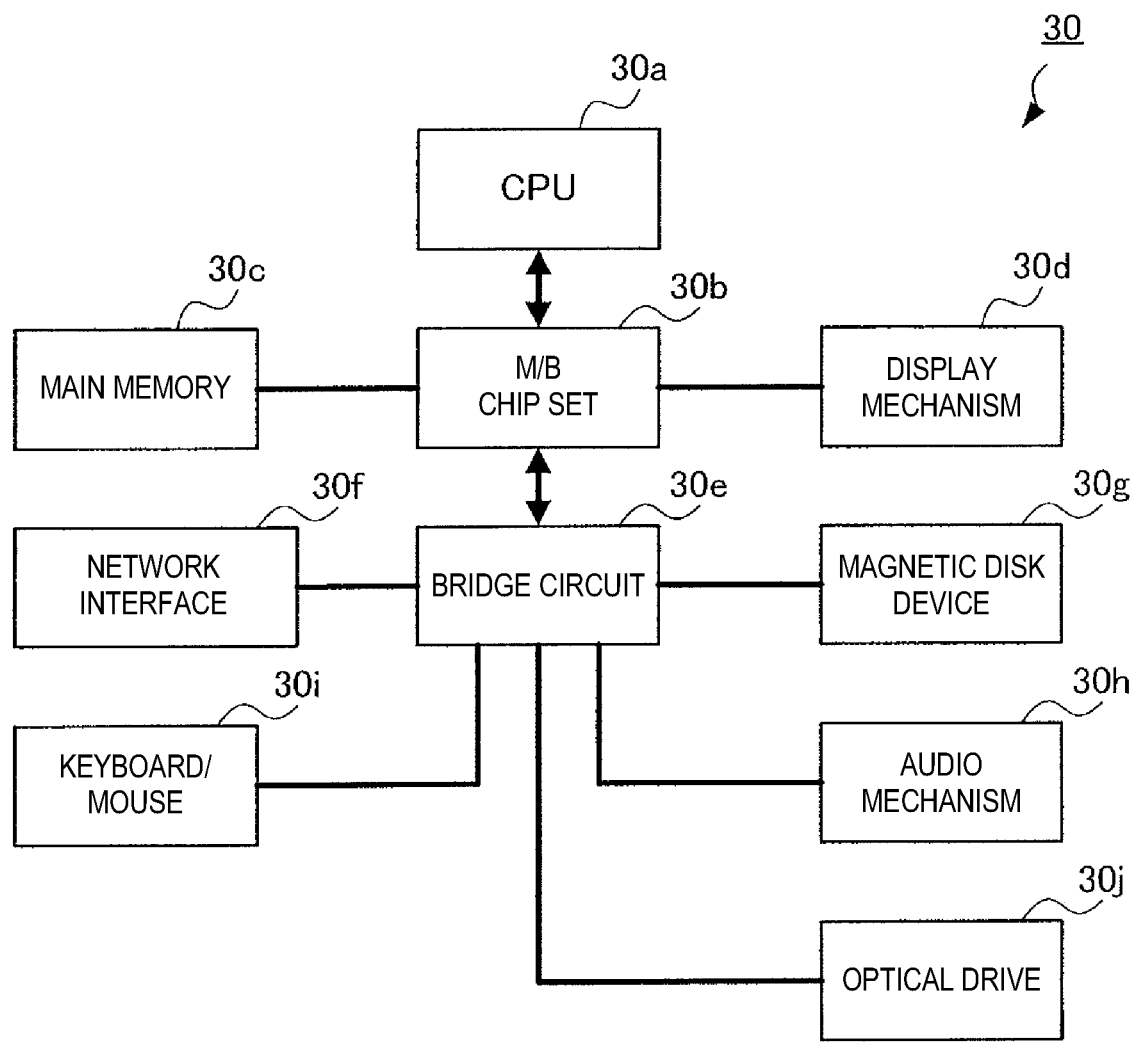
FIG. 10 is a diagram illustrating a hardware configuration example of the endpoint management server according to the embodiment of the present invention.

Hardware Configuration of Endpoint Management Server According to Present Embodiment FIG. 10 is a diagram illustrating a hardware configuration example of the endpoint management server 30 according to the present embodiment. As illustrated in FIG. 10, the endpoint management server 30 includes: a central processing unit (CPU) 30a as arithmetic means; a main memory 30c that is connected to the CPU 30a through a motherboard (M/B) chip set 30b; and a display mechanism 30d that is similarly connected to the CPU 30a through the M/B chip set 30b. Moreover, a network interface 30f, a magnetic disk device (HDD) 30g, an audio mechanism 30h, a keyboard/mouse 30i, and an optical drive 30j are connected to the M/B chip set 30b through a bridge circuit 30e.

Note that the constituent elements in FIG. 10 are connected to one another through buses. For example, the CPU 30a and the M/B chip set 30b are connected to each other through a CPU bus, and the M/B chip set 30b and the main memory 30c are connected to each other through a CPU bus. Moreover, although the M/B chip set 30b and the display mechanism 30d may be connected to each other through Accelerated Graphics Port (AGP), in the case where the display mechanism 30d includes a video card compliant with PCI Express, the M/B chip set 30b and the video card are connected to each other through a PCI Express (PCIe) bus. Moreover, for example, PCI Express can be used to connect the network interface 30f to the bridge circuit 30e. Moreover, for example, Serial AT Attachment (ATA), parallel transfer ATA, and Peripheral Components Interconnect (PCI) can be used to connect the magnetic disk device 30g to the bridge circuit 30e. Further, Universal Serial Bus (USB) can be used to connect each of the keyboard/mouse 30i and the optical drive 30j to the bridge circuit 30e.

Here, the present invention may be achieved entirely by hardware, and may be achieved entirely by software. The present invention may also be achieved by both hardware and software. Moreover, the present invention can be achieved as a computer, a data processing system, and a computer program. The computer program can be provided in the state where the computer program is stored in a computer-readable medium. Conceivable media include electronic, magnetic, optical, electromagnetic, infrared, and semiconductor systems (apparatuses, devices) as well as a propagation medium. Moreover, examples of the computer-readable medium include a semiconductor, a solid-state memory, a magnetic tape, a removable computer diskette, a random access memory (RAM), a read only memory (ROM), a rigid magnetic disk, and an optical disk. Examples of the optical disk at present include a compact disc read only memory (CD-ROM), a compact disc read/write (CD-R/W), and a DVD.

Hereinabove, the present invention has been described by way of the embodiment, and the technical range of the present invention is not limited to the above-mentioned embodiment. It is obvious for those skilled in the art that various changes and alternative modes of the present invention can be adopted without departing from the spirit and range of the present invention.

REFERENCE SIGNS LIST

10 . . . management target endpoint
20 . . . test environment endpoint
30 . . . endpoint management server
31 . . . information collection unit
32 . . . configuration information DB
33 . . . working status DB
34 . . . change history DB
35 . . . degree-of-similarity calculation unit
36 . . . application target determination unit
37 . . . configuration change instruction unit
40 . . . endpoint management console
50 . . . asset information server
60 . . . organization information server

What is claimed is:

1. An apparatus for updating software or for changing configuration of software installed in a plurality of terminals, comprising an endpoint management server configured to:

recognize that the software installed in a first terminal of the plurality of terminals has been successfully updated or the configuration of the software installed in a first terminal of the plurality of terminals has been successfully changed, wherein the configuration is determined to have been successfully changed by monitoring operation of the terminal for a predetermined operation evaluation period without confirmation of an occurrence of trouble, the endpoint management server further configured to recognize that the software installed in a second terminal has not been successfully updated or the configuration of the software installed in the second terminal has not been successfully changed;

select, in response to the recognition that the software installed in the first terminal has been successfully updated or the configuration of the software installed in a first terminal of the plurality of terminals has been successfully changed, one or more terminals of the plurality of terminals in a case where a degree of similarity between a configuration of the first terminal and a configuration of each of the one or more terminals is determined to be equal to or higher than a predetermined reference value, the one or more terminals including the second terminal that is selected based on a user of the second terminal having an IT skill level that is equal to or higher than a predetermined reference value, wherein the IT skill level is identified on the basis of at least one of working records of a registry editor or a system tool;

give an instruction to sequentially update the software or to change the configuration of the software installed in each of the one or more terminals, such that terminals of the one or more terminals that are more like the first terminal are updated or changed before terminals that are less like the first terminal, wherein each of the one or more terminals of the plurality of terminals determined, by the endpoint management server, to have its configuration successfully changed is grouped with the first terminal as a new reference endpoint, such that additional terminals of the plurality of terminals are selected, by the endpoint management server, in cases where a first degree of similarity between a configuration of one of the additional terminals and a configuration of one of the new reference endpoints is determined to be equal to or higher than a predetermined reference value and a second degree of similarity between the configuration of the one of the additional terminals and the configuration of the first terminal is determined to be lower than the predetermined reference value, and further for giving an instruction, in response to detecting, by the endpoint management server, that the software installed in the second terminal has not been successfully updated or the configuration of the software installed in the second terminal has not been successfully changed, to stop updating or changing the one or more terminals; and generate information indicating a difference between a configuration of the first terminal and a configuration of the second terminal of the one or more terminals in response to determining, by the endpoint management server, that the software installed in the second terminal has not been successfully updated or the configuration of the software installed in the second terminal has not been successfully changed after it is recognized that the software installed in the first terminal has been successfully updated or the configuration of the software installed in the first terminal has been successfully changed.

2. The apparatus according to claim 1, wherein:

the endpoint management server further selects, in response to the recognition that the software installed in the first terminal has been successfully updated or the configuration of the software installed in the first terminal has been successfully changed, a third terminal of the plurality of terminals in a case where a degree of similarity between the configuration of the first terminal and a configuration of the third terminal is equal to or higher than a predetermined reference value, and the endpoint management server further gives an instruction to update the software or to change the configuration of the software installed in the third terminal.

3. The apparatus according to claim 2, wherein the endpoint management server selects the second terminal and the third terminal in a case where a degree of association between a user of the second terminal and a user of the third terminal satisfies a predetermined condition.

4. The apparatus according to claim 2, wherein the endpoint management server selects the second terminal and the third terminal in a case where a degree of association between an installation place of the second terminal and an installation place of the third terminal satisfies a predetermined condition.

5. The apparatus according to claim 1, wherein:

the endpoint management server recognizes that the software installed in a third terminal of the plurality of terminals has been successfully updated or the configuration of the software installed in a third terminal of the plurality of terminals has been successfully changed, the endpoint management server selects, in response to the recognition that the software installed in the third terminal has been successfully updated or the configuration of the software installed in the third terminal has been successfully changed, a fourth terminal of the plurality of terminals in a case where at least any one of: a degree of similarity between the configuration of the first terminal and a configuration of the fourth terminal; and a degree of similarity between a configuration of the third terminal and the configuration of the fourth terminal is equal to or higher than a predetermined reference value, and the endpoint management server gives an instruction to update the software or to change the configuration of the software installed in the fourth terminal.

6. The apparatus according to claim 1, the endpoint management server further configured to generate information indicating a difference between a configuration of a third terminal of the plurality of terminals and a configuration of a fourth terminal of the plurality of terminals, in a case where it is not recognized that the software installed in the fourth terminal has been successfully updated or the configuration of the software installed in the fourth terminal has been successfully changed after it is recognized that the software installed in the third terminal has been successfully updated or the configuration of the software installed in the third terminal has been successfully changed.

7. A computer program product comprising a computer readable storage medium having program instructions embodied therewith, wherein the computer readable storage medium is not a transitory signal per se, the program instructions executable by a processor to cause a computer to function as an apparatus for updating software or for changing configuration of software installed in a plurality of terminals, the computer program product causing the computer to:

recognize that the software installed in a configuration change verification terminal of the plurality of terminals has been successfully updated or the configuration of the software installed in a configuration change verification terminal of the plurality of terminals has been successfully changed, the configuration change verification terminal being for verifying the update or the configuration change of the software, wherein the configuration is determined to have been successfully changed by monitoring operation of the terminal for a predetermined operation evaluation period without confirmation of an occurrence of trouble, the computer program product further causing the computer to recognize that the software installed in a second terminal has not been successfully updated or the configuration of the software installed in the second terminal has not been successfully changed;

select, in response to the recognition that the software installed in the configuration change verification terminal has been successfully updated or the configuration of the software installed in the configuration change verification terminal has been successfully changed, configuration change target terminals of the plurality of terminals in descending order of a degree of similarity between a configuration of the configuration change verification terminal and a configuration of each of the configuration change target terminals is determined to be equal to or higher than a predetermined reference value, the configuration change target terminals including the second terminal that is selected based on a user of the second terminal having an IT skill level that is equal to or higher than a predetermined reference value, wherein the IT skill level is identified on the basis of at least one of working records of a registry editor or a system tool, the configuration change target terminals being for executing the update or the configuration change of the software;

give an instruction to sequentially update the software or to change the configuration of the software installed in each of the configuration change target terminals, in the order in which the configuration change target terminals are selected, such that terminals of the one or more terminals that are more like the configuration change verification terminal are updated or changed before terminals that are less like the configuration change verification terminal, wherein each of the configuration change target terminals is determined to have its configuration successfully changed is grouped with the configuration change verification terminal as a new reference endpoint, such that additional terminals of the plurality of terminals are selected in cases where a first degree of similarity between a configuration of one of the additional terminals and a configuration of one of the configuration change target terminals is determined to be equal to or higher than a predetermined reference value and a second degree of similarity between the configuration of the one of the additional terminals and the configuration of the configuration change verification terminal is determined to be lower than the predetermined reference value, and further for giving an instruction, in response to detecting that the software installed in the second terminal has not been successfully updated or the configuration of the software installed in the second terminal has not been successfully changed, to stop updating or changing the one or more terminals; and generate information indicating a difference between a configuration of the configuration change verification terminal and a configuration of the second terminal of the configuration change target terminals in response to determining that the software installed in the second terminal has not been successfully updated or the configuration of the software installed in the second terminal has not been successfully changed after it is recognized that the software installed in the configuration change verification terminal has been successfully updated or the configuration of the software installed in the configuration change verification terminal has been successfully changed.

8. A method for updating software or for changing configuration of software installed in a plurality of terminals, comprising:

giving an instruction to update the software or to change the configuration of the software installed in a first terminal of the plurality of terminals;

recognizing that the software installed in the first terminal has been successfully updated or the configuration of the software installed in the first terminal has been successfully changed, wherein the configuration is determined to have been successfully changed by monitoring operation of the terminal for a predetermined operation evaluation period without confirmation of an occurrence of trouble;

selecting, in response to the recognition that the software installed in the first terminal has been successfully updated or the configuration of the software installed in the first terminal has been successfully changed, one or more terminals of the plurality of terminals in a case where a degree of similarity between a configuration of the first terminal and a configuration of each of the one or more terminals is equal to or higher than a predetermined reference value, the one or more terminals including a second terminal that is selected based on a user of the second terminal having an IT skill level that is equal to or higher than a predetermined reference value, wherein the IT skill level is identified on the basis of at least one of working records of a registry editor or a system tool;

giving an instruction to sequentially update the software or to change the configuration of the software installed in each of the one or more terminals, such that terminals of the one or more terminals more like the first terminal are updated or changed before terminals that are less like the first terminal;

adding sequentially the one or more terminals as new reference endpoints as each of the one or more terminals are determined to be successfully updated or the configuration of the software has been successfully changed;

selecting additional terminals of the plurality of terminals in cases where a degree of similarity between a configuration of one of the additional terminals and a configuration of one of the new reference endpoints is determined to be equal to or higher than a predetermined reference value and the degree of similarity between the configuration of the one of the additional terminals and the configuration of the first terminal is determined to be lower than the predetermined reference value;

detecting that the software installed in the second terminal has not been successfully updated or the configuration of the software installed in the second terminal has not been successfully changed;

giving an instruction, in response to detecting that the software installed in the second terminal has not been successfully updated or the configuration of the software installed in the second terminal has not been successfully changed, to stop updating or changing the one or more terminals; and generating information indicating a difference between a configuration of the first terminal of the plurality of terminals and a configuration of the second terminal of the plurality of terminals in response to determining that the software installed in the second terminal has not been successfully updated or the configuration of the software installed in the second terminal has not been successfully changed after it is recognized that the software installed in the first terminal has been successfully updated or the configuration of the software installed in the first terminal has been successfully changed.

9. The method of claim 8, further comprising:

selecting, in response to the recognition that the software installed in the first terminal has been successfully updated or the configuration of the software installed in the first terminal has been successfully changed, a third terminal of the plurality of terminals in a case where a degree of similarity between the configuration of the first terminal and a configuration of the third terminal is equal to or higher than a predetermined reference value; and giving an instruction to update the software or to change the configuration of the software installed in the third terminal.

10. The method of claim 9, wherein the second terminal and the third terminal are selected in a case where a degree of association between an installation place of the second terminal and an installation place of the third terminal satisfies a predetermined condition.

11. The method of claim 9, wherein the second terminal and the third terminal are selected in a case where a degree of association between an installation place of the second terminal and an installation place of the third terminal satisfies a predetermined condition.

12. The method of claim 8, further comprising:

recognizing that the software installed in a third terminal of the plurality of terminals has been successfully updated or the configuration of the software installed in a third terminal of the plurality of terminals has been successfully changed;

selecting, in response to the recognition that the software installed in the third terminal has been successfully updated or the configuration of the software installed in the third terminal has been successfully changed, a fourth terminal of the plurality of terminals in a case where at least any one of: a degree of similarity between the configuration of the first terminal and a configuration of the fourth terminal, and a degree of similarity between a configuration of the third terminal and the configuration of the fourth terminal is equal to or higher than a predetermined reference value; and giving an instruction to update the software or to change the configuration of the software installed in the fourth terminal.

13. The method of claim 8, further comprising:

generating information indicating a difference between a configuration of a third terminal of the plurality of terminals and a configuration of a fourth terminal of the plurality of terminals, in a case where it is not recognized that the software installed in the fourth terminal has been successfully updated or the configuration of the software installed in the fourth terminal has been successfully changed after it is recognized that the software installed in the third terminal has been successfully updated or the configuration of the software installed in the third terminal has been successfully changed.

* * * * *